US011606601B2

(12) United States Patent
Ryu

(10) Patent No.: US 11,606,601 B2
(45) Date of Patent: *Mar. 14, 2023

(54) METHOD AND DEVICE FOR COMMUNICATING BETWEEN DEVICES IN MULTIMEDIA SYSTEM

(71) Applicant: Samsung Electronics Co., Ltd., Suwon-si (KR)

(72) Inventor: Young-Sun Ryu, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/509,557

(22) Filed: Oct. 25, 2021

(65) Prior Publication Data

US 2022/0046317 A1  Feb. 10, 2022

Related U.S. Application Data

(63) Continuation of application No. 15/562,296, filed as application No. PCT/KR2016/003433 on Apr. 1, 2016, now Pat. No. 11,159,844.

(30) Foreign Application Priority Data

Apr. 1, 2015 (KR) .................. 10-2015-0046455
May 26, 2015 (KR) .................. 10-2015-0073340
Jun. 5, 2015 (KR) .................. 10-2015-0080209

(51) Int. Cl.
*H04N 21/436* (2011.01)
*H04N 21/41* (2011.01)
(Continued)

(52) U.S. Cl.
CPC ....... *H04N 21/43615* (2013.01); *H04L 67/51* (2022.05); *H04N 21/4126* (2013.01);
(Continued)

(58) Field of Classification Search
None
See application file for complete search history.

(56) References Cited

U.S. PATENT DOCUMENTS 9,538,255 B2   1/2017  Isozaki et al.
2001/0049718 A1  12/2001  Ozawa
(Continued)

FOREIGN PATENT DOCUMENTS

CN   10115714 A    3/2008
CN   101911553 A  12/2010
(Continued)

OTHER PUBLICATIONS

HbbTV Association; "HbbTV 2.0 Specification"; XP055177673; Feb. 2, 2015; pp. 1-249.
(Continued)

*Primary Examiner* — Tonia L Dollinger
*Assistant Examiner* — Jonathan A Sparks
(74) *Attorney, Agent, or Firm* — Jefferson IP Law, LLP

(57) ABSTRACT

The present invention relates to a method and device for transmitting/receiving information efficiently between devices in a multimedia system. A method of communicating between devices in a multimedia system according to an embodiment of the present invention includes the steps of: searching a second device for a first device to use a broadcast service or content; acquiring second information on at least one service terminal point for the first device to receive first information related to the broadcast service or the content from the second device; requesting, by means of the first device, the transmission of the first information related to the broadcast service or the content by using the second information; and receiving, by means of the first device from the second device, the first information as a response to the request.

10 Claims, 5 Drawing Sheets

(51) Int. Cl.
  *H04N 21/426*   (2011.01)
  *H04N 21/81*   (2011.01)
  *H04N 21/4402*   (2011.01)
  *H04L 67/51*   (2022.01)
  *H04N 21/44*   (2011.01)
  *H04L 67/02*   (2022.01)

(52) U.S. Cl.
  CPC ..... *H04N 21/42684* (2013.01); *H04N 21/436* (2013.01); *H04N 21/44* (2013.01); *H04N 21/4402* (2013.01); *H04N 21/814* (2013.01); *H04N 21/8173* (2013.01); *H04N 21/8186* (2013.01); *H04L 67/02* (2013.01)

(56) References Cited

U.S. PATENT DOCUMENTS

| | | |
|---|---|---|
| 2008/0072317 A1 | 3/2008 | Lee et al. |
| 2009/0204997 A1 | 8/2009 | Xu et al. |
| 2009/0222514 A1 | 9/2009 | Igarashi |
| 2011/0055867 A1 | 3/2011 | Lee et al. |
| 2011/0066756 A1 | 3/2011 | Kakumaru |
| 2011/0239253 A1 | 9/2011 | West et al. |
| 2011/0314168 A1 | 12/2011 | Bathiche et al. |
| 2013/0124937 A1 | 5/2013 | Kim et al. |
| 2013/0176956 A1 | 7/2013 | Yamamoto |
| 2013/0312059 A1 | 11/2013 | Otsuki et al. |
| 2014/0053182 A1 | 2/2014 | Jaager et al. |
| 2014/0214967 A1 | 7/2014 | Baba et al. |
| 2014/0250480 A1 | 9/2014 | Koh et al. |
| 2014/0310599 A1 | 10/2014 | Clift et al. |
| 2014/0317669 A1 | 10/2014 | Ryu et al. |
| 2016/0044361 A1 | 2/2016 | Delpuch et al. |
| 2016/0165303 A1 | 6/2016 | Kang et al. |
| 2016/0239353 A1 | 8/2016 | Ryu |
| 2016/0241614 A1* | 8/2016 | Kang ............ H04L 65/61 |
| 2016/0241934 A1 | 8/2016 | Harrison |
| 2016/0249114 A1 | 8/2016 | Ryu |
| 2016/0286279 A1 | 9/2016 | Yang et al. |
| 2016/0337449 A1* | 11/2016 | Yang ............ H04L 67/06 |
| 2017/0250767 A1* | 8/2017 | Deshpande ........ H04H 20/93 |

FOREIGN PATENT DOCUMENTS

| | | |
|---|---|---|
| CN | 102027767 A | 4/2011 |
| CN | 102947816 A | 2/2013 |
| CN | 103001959 A | 3/2013 |
| CN | 103200647 A | 7/2013 |
| CN | 103702238 A | 4/2014 |
| CN | 103988447 A | 8/2014 |
| CN | 104105000 A | 10/2014 |
| EP | 2 750 309 A1 | 7/2014 |
| EP | 3 214 774 A1 | 9/2017 |
| JP | 2013-066159 A | 4/2013 |
| JP | 2014-072600 A | 4/2014 |
| JP | 2017-505014 A | 2/2017 |
| KR | 10-2010-0127162 A | 12/2010 |
| KR | 10-2013-0053650 A | 5/2013 |
| KR | 10-1413246 B1 | 8/2014 |
| KR | 10-2014-0125686 A | 10/2014 |
| WO | 2012/001270 A1 | 1/2012 |
| WO | 2013/045922 A1 | 4/2013 |
| WO | 2013/060022 A1 | 5/2013 |
| WO | 2015-030412 A1 | 3/2015 |
| WO | 2015/041488 A1 | 3/2015 |
| WO | 2015-041494 A1 | 3/2015 |
| WO | 2016/068564 A1 | 5/2016 |

OTHER PUBLICATIONS

Chinese Office Action with English translation dated Sep. 4, 2019; Chinese Appln. No. 201680019429.2.

Japanese Office Action with English translation dated Oct. 29, 2019; Japanese Appln. No. 2017-551303.

"Hypertext Transfer Protocol—HTTP/1.1", Fielding et al., 1999. (Year: 1999).

"UPnP Device Architecture 1.0", UPnP Forum, Apr. 2008. (Year: 2008).

"Integrating the Google Cast Technology in a Second-screen Solution", Lavrell, Final Thesis, Institutionen for datavetenskap—Department of Computer and Information Science, 2014. (Year: 2014).

Huang et al.; Design and Implementation for Mobile Multimedia Terminal Based on DVB-IPDC; Computer Technology and Development; vol. 19 No. 6; Jun. 2009.

SMT; Shanghai Metrology and Testing—A Preliminary Study on Networking Standards for Household Appliance; Comprehensive Review; Electronic Publishing House; http://www.cnki.net Chinese Decision on Grant with English translation dated Jan. 18, 2023; Chinese Appln No. 202210173221.3.

Chinese Decision on Grant with English translation dated Jan. 18, 2023; Chinese Appln No. 202210172370.8.

* cited by examiner

METHOD AND DEVICE FOR COMMUNICATING BETWEEN DEVICES IN MULTIMEDIA SYSTEM

CROSS-REFERENCE TO RELATED APPLICATION(S)

This application is a continuation application of prior application Ser. No. 15/562,296, filed on Sep. 27, 2017, which is based on and claims priority of a U.S. National Stage application under 35 U.S.C. § 371 of an International Application filed on Apr. 1, 2016 and assigned application number PCT/KR2016/003433, which claimed the benefit of a Korean Patent Application filed on Apr. 1, 2015 in the Korean Intellectual Property Office and assigned serial number 10-2015-0046455, and also claimed the benefit of Korean Patent Application filed on May 26, 2015 in the Korean Intellectual Property Office and assigned serial number. 10-2015-0073340, and also claimed the benefit of Korean Patent Application filed on Jun. 5, 2015 in the Korean Intellectual Property Office and assigned serial number 10-2015-0080209, the entire disclosures of each of which are hereby incorporated by reference.

TECHNICAL FIELD

The present invention relates to a method and a device for transmitting/receiving various pieces of information, including information related to a broadcast service, content, and the like, between devices in a multimedia system.

BACKGROUND ART

With the advancement of broadcast systems providing a multimedia service, technologies have been developed which allow multiple devices to communicate with each other and use a broadcast service in a wired or wireless broadcast system. As an example, a multi-screen service and the like are provided which, through communication between a digital Television (TV) installed in a house and a portable terminal (e.g., a smartphone, a tablet Personal Computer (PC), etc.), enables a user to continuously view the content, which the user had been watching on the digital TV, on the portable terminal, or enables the user to continuously watch the content, which the user had been viewing on the portable terminal, on the digital TV.

Hereinafter, in the present specification, the digital TV, a Set-Top Box (STB) connected to the digital TV, or the like will be referred to as a "Primary Device (PD)" for use of a broadcast service or content, and the portable terminal or the like will be referred to as a "Companion Device (CD)" for use of a broadcast service or content.

FIG. 1 is a view schematically illustrating an example of a typical multimedia system that supports a multi-screen service.

Referring to FIG. 1, a PD 110 may receive various broadcast services, including terrestrial broadcasting, cable broadcasting, and the like, by wire or wirelessly. The PD 110 may have various applications 111 installed therein which are related to the use of a broadcast service, and may include a Companion Screen (CS) manager 113 for communication with a CD 130, for a multi-screen service and the like. Also, various applications 131 related to the use of a broadcast service may be installed in the CD 130. Although one PD 110 and one CD 130 are illustrated for convenience of description in FIG. 1, one or multiple PDs and CDs may exist. The PD 110 may communicate with the CD 130 according to various wireless or wired communication schemes, including Wi-Fi and the like.

In FIG. 1, the CD 130 discovers (as indicated by reference numeral 101) whether the available PD 110 exists in order to use a multi-screen service according to the execution of the application 131. When the available PD 110 has been found, the application 131 of the CD 130 communicates (as indicated by reference numeral 103) with the CS manager 113 in order to launch the application 111 of the PD 110. Then, the CS manager 113 launches (as indicated by reference numeral 105) the application 111 of the PD 110. As described in the above operation, the PD 110 and the CD 130 exchange data required for use of a multi-screen service through the applications 111 and 131. The multimedia system illustrated in FIG. 1 is appropriate for an application-centric model in which the applications 111 and 131 are respectively launched by the PD 110 and the CD 130 and the PD 110 and the CD 130 exchange required information through communication between the applications.

However, in the multimedia system illustrated in FIG. 1, when the application 111 of the PD 110 is not provided through the multimedia system or the application 111 fails to be launched, only the application 131 of the CD 130 is launched, and thus, communication between the applications is not performed by the PD 110 and the CD 130. In this case, the PD 110 may not launch a related application for communication between applications, and thus, a multi-screen service and the like using the PD 110 and the CD 130 may not be stably provided.

DETAILED DESCRIPTION OF THE INVENTION

Technical Problem

The present invention provides a communication method and a communication device for efficiently transmitting/receiving information between devices in a multimedia system.

Also, the present invention provides a method and a device for transmitting/receiving broadcast-related information between a PD and a CD without launching an application by the PD in a multimedia system.

Solution to Problem

In accordance with an aspect of the present invention, a method for communication between devices in a multimedia system is provided. The method includes: discovering, by a first device, a second device for use of a broadcast service or content; acquiring, by the first device, second information on at least one service endpoint for reception of first information related to the broadcast service or the content from the second device; making, by the first device, a request for transmission of the first information related to the broadcast service or the content by using the second information; and receiving, by the first device, the first information from the second device in response to the request.

Also, in accordance with another aspect of the present invention, a first device for performing communication between devices in a multimedia system is provided. The first device includes: a communication interface for communication with a second device for use of a broadcast service or content; and a controller that performs a control operation for discovering a second device through the communication interface, acquiring second information on at least one service endpoint for reception of first information related to the broadcast service or the content from the second device, making a request for transmission of the first information related to the broadcast service or the content by using the second information, and receiving the first information from the second device in response to the request.

MODE FOR CARRYING OUT THE INVENTION

In the following description of embodiments of the present invention, a detailed description of known functions or configurations related to the present invention will be omitted when it is determined that the detailed description thereof may unnecessarily obscure the subject matter of the present invention.

Embodiments of the present invention described below propose a method in which, when a multi-screen service is provided by a multimedia system including multiple devices connected to each other, a primary device (e.g., a PD) receiving and reproducing a broadcast signal provides an auxiliary device (e.g., a CD) with information related to a broadcast being reproduced. The PD and the CD can be understood in the sense of being collectively called a primary device and an auxiliary device capable of transmitting/receiving information required to receive a broadcast service and broadcast content, public information, broadcast program information, or the like (hereinafter the "broadcast-related information") through communication between devices. One PD and one CD or multiple PDs and multiple CDs may exist.

As an example, as described above, the PD may be a digital TV, an STB, and the like, and the CD may be portable terminals, including a smartphone, a tablet PC, and the like. As another example, multiple digital TVs may operate as PDs or CDs, and multiple portable terminals may operate as PDs or CDs. Embodiments of the present invention provide a specific method in which a CD directly sends, to a PD, a request for the broadcast-related information on a broadcast service, broadcast content, or the like being reproduced by the PD that does not launch an application for communication with the CD (or that is not provided with the application) and, according to the request, the PD provides the CD with the broadcast-related information. In embodiments of the present invention, even without launching an application by a PD, an application of a CD may receive the broadcast-related information from the PD and may provide a user with a broadcast service and the like provided by the PD. In embodiments of the present invention, the broadcast-related information corresponds to various pieces of status information, including an identifier, data, reproduction information, alert information, and the like regarding a broadcast service, broadcast content, or the like being reproduced by a PD. Therefore, hereinafter, the broadcast-related information will be referred to as "PD status information" (or information related to a service and/or content of the PD). The PD status information may include at least one piece of information among, for example, identification information (Content IDentifier (CID)), Electronic Service Guide (ESG) information, media data, media timeline information, media reproduction information, and emergency alert information (Emergency Alert Message (EAM)) regarding a broadcast service or content.

Figure 2:
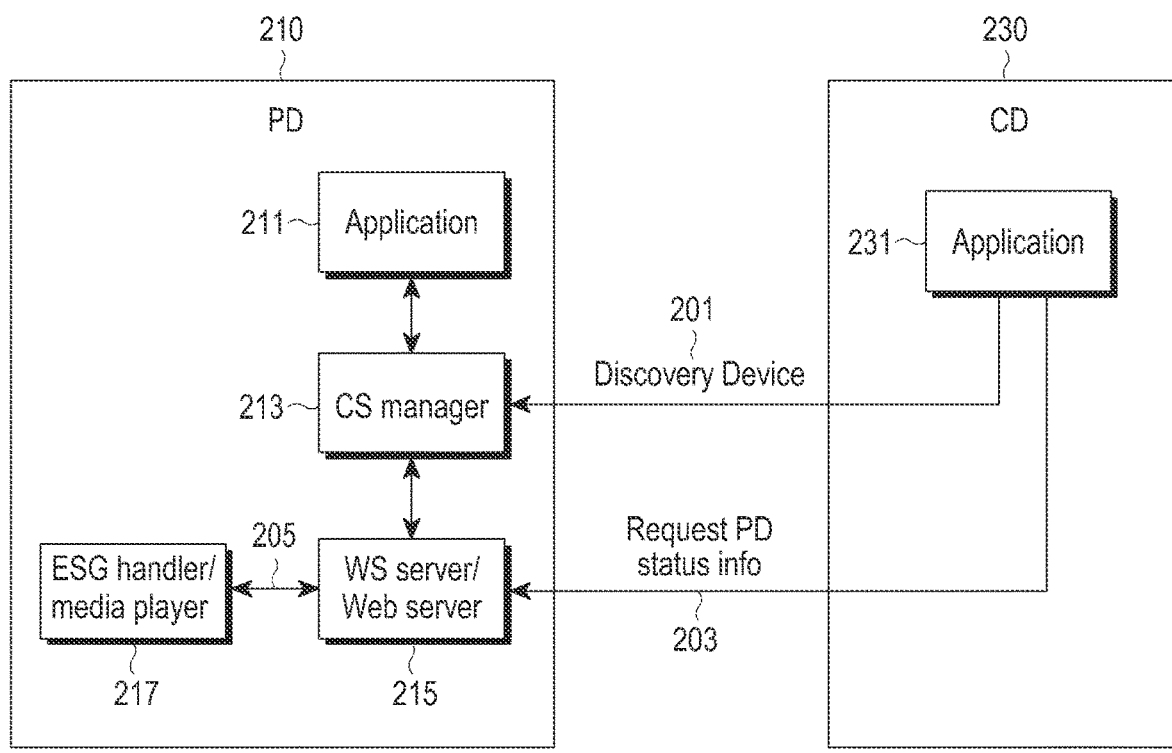
FIG. 2 is a view illustrating a configuration of a multimedia system including devices performing communication therebetween according to an embodiment of the present invention.

FIG. 2 is a view illustrating a configuration of a multimedia system including devices performing communication therebetween according to an embodiment of the present invention.

Referring to FIG. 2, a PD 210 includes an application 211, a CS manager 213, a WebSocket (WS) server/web server 215, and an Electronic Service Guide (ESG) handler/media reproducer 217, and a CD 230 includes an application 231 for sending, to the PD 210, a request for the PD status information and receiving the PD status information. The CD 230 may provide a user with a broadcast service, broadcast content, or the like being reproduced by the PD 210 by using the PD status information.

Figure 1:
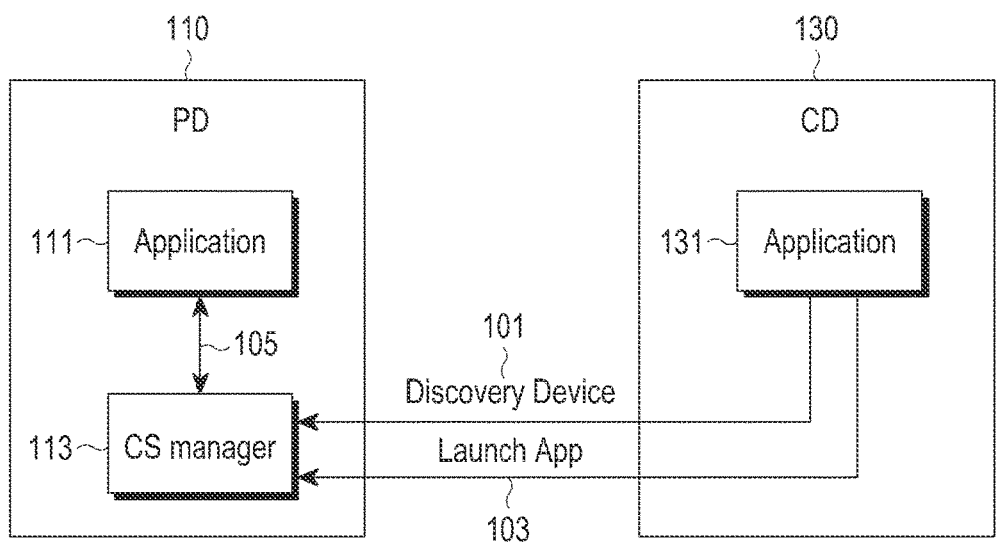
FIG. 1 is a view schematically illustrating an example of a typical multimedia system that supports a multi-screen service.

In FIG. 2, in describing a configuration of the PD 210, the application 211 may be various applications associated with a broadcast service or broadcast content. Also, the application 211 may perform communication between the CD 230 and an application in the same manner as the application 111 described in FIG. 1. Accordingly, in embodiments of the present invention, the application 211 is not an essential element, and may be selectively included in the PD 210. The CS manager 213 performs operations for interworking between the PD 210 and the CD 230. The operations include at least one of a response to a request 201 for discovery of an available PD which has been received from the CD 230, processing of a request for launching of the application 211 which has been sent by the CD 230, and an operation of receiving the PD status information (i.e., information related to a service and/or content of the PD) from the ESG handler/media reproducer 217 and providing the received PD status information to the CD 230, when a request 203 for the PD status information has been received from the CD 230 through the WS server/web server 215 according to an embodiment of the present invention.

In the embodiment of FIG. 2, the WS server/web server 215 is used as a communication interface for communication with the CD 230 and is illustrated as an element separated from the CS manager 213. However, as another implementation example, the CS manager 213 may include the WS server/web server 215. The WS server/web server 215 may use a WebSocket protocol for bi-directional communication with the CD 230. In this case, the PD status information (i.e., information related to a service and/or content of the PD) is transmitted to the CD 230 by using the WebSocket protocol. The WebSocket protocol is processed by the WS server. Also, the WS server/web server 215 transmits the PD status information (i.e., information related to a service and/or content of the PD) to the CD 230 by using a HyperText Transfer Protocol (HTTP) protocol. The HTTP protocol is processed by the web server. In the ESG handler/media reproducer 217 illustrated in FIG. 2, the ESG handler processes an ESG transmitted in a state of being included in a broadcast program, and delivers at least one piece of information requested by the CS manager 213 to the CS manager 213 or the WS server/web server 215, in order to provide (as indicated by reference numeral 205) the PD status information. In the ESG handler/media reproducer 217, the media reproducer reproduces a broadcast program, and delivers at least one piece of information requested by the CS manager 213 to the CS manager 213 or the WS server/web server 215, in order to provide (as indicated by reference numeral 205) of the PD status information.

The configuration of the PD 210 and the CD 230 illustrated as an example in FIG. 2 corresponds to one implementation example represented in the form of a functional block. The PD 210 may include at least one processor (i.e., a controller) taking charge of functions of the CS manager 213 and the ESG handler/media reproducer 217, a communication interface taking charge of a function of the WS server/web server 215, and a storage unit having the application 211 installed therein. The application 211 of the PD 210 may be a selective element as described above, and thus may be omitted. Also, the CD 230 may include a storage unit having the application 231 installed therein, a communication interface for communication with the PD 210, and a controller that controls an overall operation for launching the application 231 and for requesting and receiving the PD status information.

Meanwhile, in the example of FIG. 2, the WS server/web server 215 and the ESG handler/media reproducer 217 are both illustrated as one block including a WS server and a web server and as one block including an ESG handler and a media reproducer, respectively. However, this configuration corresponds to the depiction of related elements as one block for convenience of description. The WS server and the web server may be implemented as divided blocks, and the SG handler and the media reproducer may also be implemented as divided blocks.

Figure 3:
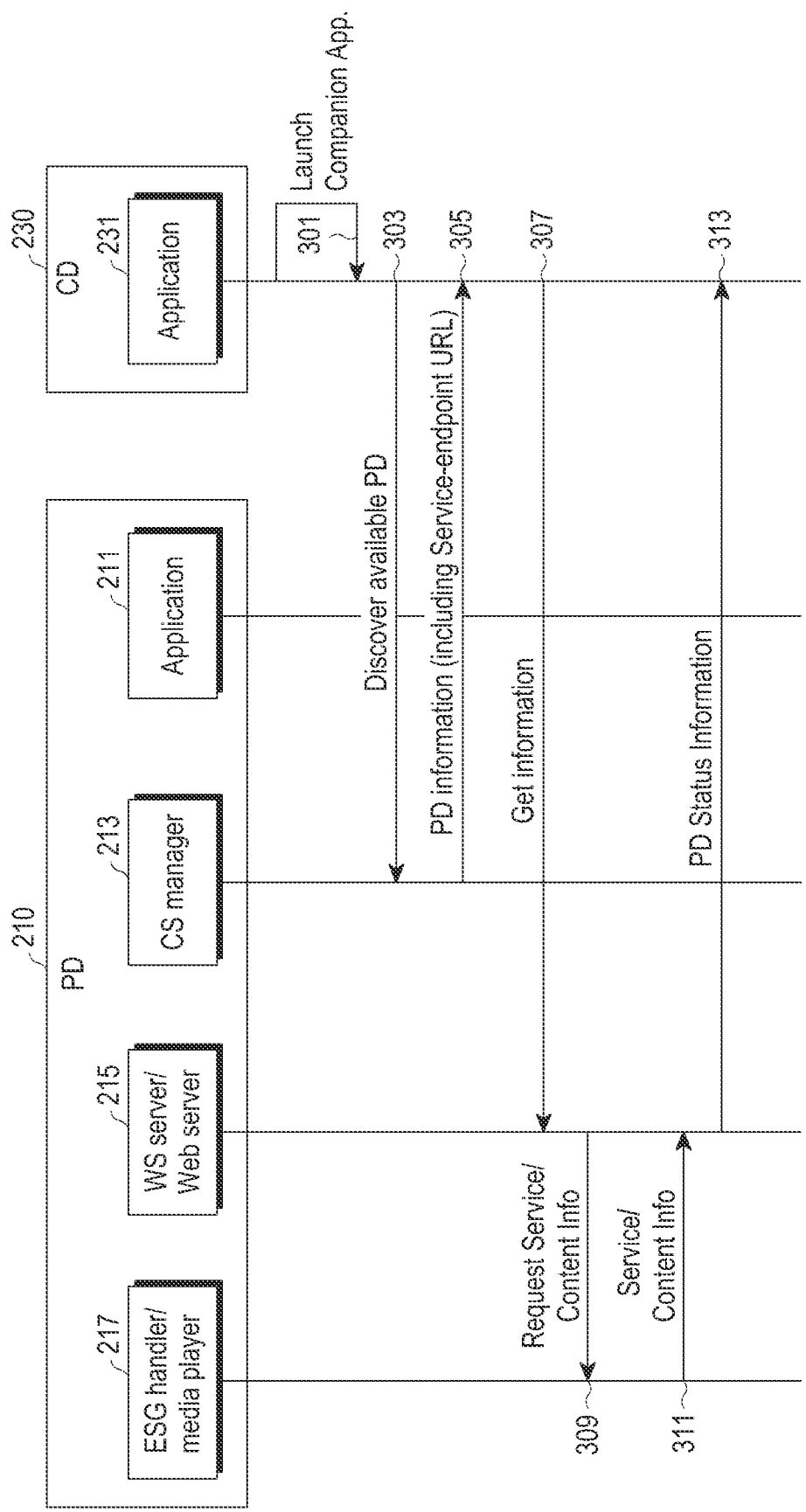
FIG. 3 is a view illustrating a method for transmitting/receiving PD status information through communication between devices in a multimedia system according to an embodiment of the present invention.

FIG. 3 is a view illustrating a method for transmitting/receiving PD status information through communication between devices in a multimedia system according to an embodiment of the present invention.

Referring to FIG. 3, when, in step 301, the application 231 of the CD 230 is launched by the operation of a key by a user and the like, in step 303, the CD 230 discovers whether an available PD exists in a network. This discovery process may typically use a Simple Service Discovery Protocol (SSDP) or a Discovery and Launch Protocol (DIAL), and may use another protocol according to a scheme for implementing the same. The PD 210 may communicate with the CD 230 in networks using various wireless communication schemes, including Wi-Fi, Bluetooth, Near Field Communication (NFC), and the like, or in wired communication networks. In step 305, the CS manager 213 of the PD 210 responds to a discovery request made by the CD 230. At this time, information, which the PD 210 transmits to the CD 230 as a response thereto, includes at least one piece of information among information on the PD 210 and information (e.g., URL information used to receive PD status information, etc.) of a service endpoint that allows the CD 230 to send a request for PD status information to the PD 210. A method for providing the information of the service endpoint will be described below. The service endpoint includes at least one of, for example, a service endpoint of a web server and a service endpoint of a WS server.

In step 307, the CD 230 sends a request for PD status information (i.e., information related to a service and/or content of a PD) to the PD 210 by using the information of the service endpoint. The request for the PD status information may be performed through an HTTP GET method or a WebSocket, and the PD status information may include at least one piece of information among, for example, identification information (CID), ESG information, media data, media timeline information, media reproduction information, and emergency alert information (EAM) regarding a broadcast service or content, as described above. In step 309, the request for the PD status information is received by the WS server/web server 215 and is delivered to the ESG handler/media reproducer 217 that is a functional block that processes the relevant information. When the relevant information is emergency alert information, the functional block may be an emergency alert manager that processes emergency alert information. In step 311, the information processed by the ESG handler/media reproducer 217 or the emergency alert manager is delivered to the WS server/web server 215, and the WS server/web server 215 delivers PD status information including the delivered information to the CD 230, in step 313. Also, control for reception of the request for the PD status information and for transmission of the PD status information may be performed by the CS manager 213. Further, the PD status information may be transmitted together with a predetermined status code. The status codes may be set to respectively correspond to the pieces of information included in the PD status information.

Hereinafter, a detailed description will be made of a method for discovering an available PD and providing information of a service endpoint according to an embodiment of the present invention.

First, the application 231 (hereinafter "CD application") of the CD 230 requests a search for an available PD in a network by using an SSDP protocol including particular Search Target (ST) header information as shown in Table 1 below.

TABLE 1

M-SEARCH * HTTP/1.1
HOST: 239.255.255.250:1900
MAN: "ssdp:discover"
MX: <seconds to delay response>
ST: urn:dial-multiscreen-org:service:dial:1

2. The PD 210 having received an SSDP request transmits an HTTP/1.1 response including a LOCATION header as shown in Table 2 below. At this time, the LOCATION header may include information which allows a request for a device description file of the PD 210.

TABLE 2

HTTP/1.1 200 OK
CACHE-CONTROL: max-age = <seconds until advertisement expires>
EXT:
LOCATION: <URL for UPnP description for root device>
SERVER: <OS/version UPnP/1.0 product/version>
ST: urn:dial-multiscreen-org:service:dial:1
USN: <advertisement UUID>

3. The CD application having received a response from the available PD 210 transmits a request for requesting a device description file of a PD as shown in Table 3 below by using the LOCATION information which has been received in a process of No. 2.

TABLE 3

GET <path component of the LOCATION URL> HTTP/1.1

4. The PD 210 transmits an Application-URL header shown in Table 4 below together with the device description file, as a response.

TABLE 4

HTTP/1.1 200 OK
CONTENT-LANGUAGE: <language used in description>
CONTENT-LENGTH: <bytes in body>
CONTENT-TYPE: text/xml: charset="utf-8"
Application-URL: http://192.168.1.11.11111/apps
Access-Control-Allow-Origin:*

5. The CD application requests information of a service endpoint by using the Application-URL information, which has been received in a process of No. 4, as shown in Table 5 below. Here, 'Hybrid broadcast broadband TV (HbbTV)' which is lastly attached to the Application-URL is one embodiment, and may be modified according to an implementation of the present invention.

TABLE 5

GET /apps/HbbTV HTTP/1.1

6. The PD 210 responds to the request by using the information shown in Table 6 below as a body together with the HTTP/1.1 OK header. The present invention proposes an example of a configuration using an Extensible Markup Language (XML), but this configuration may also use any text-based format (e.g., JavaScript Object Notation (JSON), etc.), which may be loaded and transmitted on a body of an HTTP response, according to an implementation of the present invention. In an example shown in Table 6 below, <X_HbbTV_App2AppURL> is used to provide a service endpoint of a WS server, and the remaining <X_HbbTV_InterDevSyncURL> and <X_HbbTV_UserAgent> information may not be used according to an implementation of the present invention. In embodiments of the present invention, two pieces of information (i.e., <X_HbbTV_InterDevSyncURL> and <X_HbbTV_UserAgent>) are not used. Similarly, according to a scheme for implementing the present invention, when it is necessary to provide additional information, a field may be newly defined and used.

TABLE 6

HTTP/1.1 200 OK
<?xml version="1.0" encoding="UTF-8">
<service xmlns="urn:dial?multiscreen?org:schemas:dial" dialVer="1.7">
　<name>HbbTV</name>
　<options allowStop="false"/>
　<state>running</state>
　<additionalData>
　　<X_HbbTV_App2AppURL>URL of App2App communication service endpoint
　　</X_HbbTV_App2AppURL>
　　<X_HbbTV_InterDevSyncURL>URL of CSS-CII service endpoint
　　</X_HbbTV_InterDevSyncURL >
　　<X_HbbTV_UserAgent>Value of HbbTV Terminal User Agent header
　　</X_HbbTV_UserAgent>
　</additionalData>
</service>

By the method for discovering a PD and providing information of a service endpoint as described in the above embodiment of the present invention, endpoint information of a web server to which an HTTP GET request can be transmitted may be acquired in the process of No. 4, and endpoint information of a WS server may be acquired in the process of No. 6.

Meanwhile, a request for PD status information in step 307 of FIG. 3 will be described in detail. The PD status information (i.e., information related to a service and/or content of a PD) may include at least one piece of information among the exemplified pieces of information shown in Table 7 below.

TABLE 7

| Status Information | Status Information ID | Request Frequency | Bi-directionality | Recommendation Method |
|---|---|---|---|---|
| service and content ID information | cid | low | unnecessary | HTTP |
| ESG information | esg | low | unnecessary | HTTP |
| media data | data | low | unnecessary | HTTP |
| media timeline information | timeline | high | necessary | WebSocket |
| media reproduction information | playback | low | necessary | WebSocket |
| emergency alert information | eam | low | necessary | WebSocket |

The respective pieces of information, which can be included in the PD status information, may be requested according to two schemes using an HTTP GET protocol and a WS protocol on the basis of a frequency of request for information and a communication scheme (e.g., (un)necessariness of bi-directionality). Examples have been shown according the two schemes in Table 1, but another scheme may be used.

First, a method for requesting PD status information according to an HTTP GET will be described.

A service endpoint to which a HTTP request is to be transmitted may use the Application-URL acquired in Table 4. At this time, in order to distinguish status information of a desired PD from another, the Application-URL may be transmitted in a state of attaching a status information ID exemplified in Table 7 to the Application-URL. For example, an example of an HTTP GET request for requesting service and content ID information is shown in Table 8 below.

TABLE 8

GET /apps/cid HTTP/L1

A response, which the PD makes to the HTTP GET request, may be transmitted in a state of being included in an HTTP status code and a body.

An example of the response is shown in Tables 9 to 12 below, which show one implementation example of a PD status information response to an HTTP request. An example of Tables 9 to 12 below proposes an example of configuration using XML, but this configuration may also use any text-based format (e.g., JSON, etc.), which may be loaded and transmitted on a body of an HTTP response, according to an implementation of the present invention. Further, respective included fields may be changed according to an implementation of the present invention.

TABLE 9

| | Description | Value |
|---|---|---|
| deviceID | Device ID of primary device | deviceID |
| serviceType | The type of service | contentID, esg, timeline, playback, earn |
| service | The information of current service | |
| esg | The information of ESG | |
| timeline | The Media timeline of current service | UTC time |
| playbackState | The playback state of current service | |
| EAM | Emergency Alert Message | |

TABLE 10

| | Description |
|---|---|
| serviceName | Description of service(text) |
| serviceID | Identifier of current service |

TABLE 11

| | Description |
|---|---|
| MPstate | PLAYING, PAUSED, STOPPED, FFOWARD, REWIND. BUFFERING, UNKNOWN |
| MPSpeed | Current speed of media state |
| MediaURL | The URL of content providing from the PD |

TABLE 12

| | Description |
|---|---|
| EAMID | Identifier of the entergency alert message |
| SentTimeStamp | Timestamp when the EAM generated |
| ExpiredTimeStamp | Timestamp of EAM is valid |
| Urgency | Urgency of EAM |
| Geo-loc | Geographical location for EAM is applicable |
| EAMContent | EAM content |
| RichEAMURL | URL provides additional information about this EAM |

Table 10 shows one configuration example of information included in a "service" field in Table 9, and Table 11 shows one configuration example of information included in a "playbackState" field in Table 9. Also, Table 12 shows one configuration example of information included in an "EAM" field in Table 9.

The meanings of the respective fields in Table 9 will be described below.

<deviceID>: describes a device ID of a PD that has transmitted PD status information.

<seviceType>: indicates the type of PD status information. Values which may be included in the PD status information may be contentID, esg, timeline, playbackState, EAM, and the like.

<service>: includes information of a service that a PD is currently providing (launching). A configuration of subordinate fields of <service> is shown in Table 10.

<esg>: indicates ESG information.

<timeline>: includes media timeline information of a service currently being provided. The timeline information is described as a Coordinated Universal Time (UTC) (i.e., an international standard time). The timeline information is used to synchronize multiple services within an identical device or services among multiple devices.

<playbackState>: includes reproduction state information of a service currently being provided. A configuration of subordinate fields of <playbackState> is shown in Table 11.

<EAM>: includes an emergency alert message. The EAM may be transmitted from a PD to a CD application without a process for sending a request to the PD by the CD application of Table 8 or 10. A configuration of subordinate fields of the EAM is shown in Table 12.

The meanings of the fields included in Table 10 will be described below.

<serviceName>: includes the name (text) of a service that a PD is providing.

<serviceID>: includes an ID of a service that a PD is providing.

The meanings of the fields included in Table 11 will be described below.

<MPState>: indicates reproduction state information of a service being provided. <MPState> may have a value, such as PLAYING, PAUSED, STOPPED, FFOWARD, REWIND, BUFFERING, or UNKNOWN.

<MPSpeed>: indicates the reproduction speed of a service being provided. <MPSpeed> may have a constant of 1 when the service is being reproduced at a normal speed, and may respectively have values of a positive multiple and a negative multiple when being in reproduction states such as FFWOWRD(fast-forward) and REWIND.

<MediaURL>: describes a URL to which a service (or content) being provided is retransmitted when the service (or content) is allowed to be retransmitted to another device. The MediaURL may be understood as, for example, a network address for accessing a service (or content) retransmitted from a PD to a CD or from a CD to a PD.

Also, the meanings of the fields included in Table 12 will be described below.

<EAMID>: indicates an ID of an EAM.

<setnTimeStamp>: includes time information at which an EAM has been generated.

<expiredTimeStamp>: includes time information during which an EAM is valid.

<urgency>: indicates the importance of an EAM.

<Geo-loc>: indicates particular area information to which an EAM is applied, when the particular area information is included.

<EAMContent>: includes an EAM (text).

<RichEAMURL>: describes URL information allowing access to additional information (e.g., an image, a moving image, a voice, etc.) other than text when the additional information is provided.

Next, a request method using a WebSocket protocol will be described.

As information of a service endpoint to which a WebSocket request is to be transmitted, <X_HbbTV_App2AppURL> acquired in Table 6 may be used. The WS supports bi-directional communication and allows any format as a payload format of the WebSocket, and thus, an embodiment of the present invention proposes the following XML payload form. However, as described above, the request method may use any form, including JSON and the like as well as XML, which the WebSocket protocol supports, according to an implementation of the present invention, and a field may also be added or deleted as much as the request method desires according to the need. Table 13 below shows an example of a request for service and content ID information according to a WS.

TABLE 13

```
<?xml version="1.0" encoding="UTF-8"?>
<GetStatusInfo>
    <statusID>cid</statusID>
    <command>subscribe</command>
    <duration>-1</duration>
</serviceInfo>
```

In Table 13, a <statusID> field is used for the purpose of requesting particular information, and the above-described example specifically describes a method for requesting service and content ID information. When the relevant field is omitted, the omission of the relevant field may be processed as a request for update of all pieces of status information and, whenever status information of a PD changes, a change in the status information of the PD may be provided to a CD.

In Table 13, a command field indicates request and/or cancellation of, the relevant information. When PD status information (i.e., information related a service and/or content of a PD)(e.g., information described as <statusID>) is updated, a CD application may request the PD to transmit the updated information. The request is described as subscribe as shown Table 14 below in the command field, renew is described when the existing request is desired to be updated, and cancel is described when the existing request is desired to be canceled. Respective meanings of subscribe, renew, and cancel are described in an example of Table 14 below. In the present embodiment, a request for the updated information is described using commands of subscribe, renew, and cancel as shown in Table 14 below. However, this configuration describes an example, and subscribe, renew, and cancel of a request for transmission of the information related to the service and/or content may be applied in a similar manner not only when the information is updated but also when the information is not updated. The command field may be understood as a subscription-related command (or message) related to request/renewal/cancellation of transmission of the information related to the service and/or content.

TABLE 14

| Command Value | Meaning |
| --- | --- |
| subscribe | when information described as <statusID> in PD is updated, PD is requested to transmit the updated information. When <statusID> is not designated as default value, transmission request is determined as subscribe. |
| renew | renews update request |
| cancel | cancels update request |

In Table 13, a duration field indicates a time period during which a request for the relevant information continues. The PD transmits the update of the relevant information only during a time period described in the duration field. When a CD application desires to continuously receive information until the CD application transmits a cancellation request, the CD application only has to transmit infinite(or −1). A case when the duration field is not described may also be determined as being infinite.

Also, when the PD receives a PD status information update request using the WebSocket protocol made by the CD application, the PD may notify the CD application of a result of processing of the PD status information update request. Here, the PD status information update request may be understood as requesting the PD to transmit updated PD status information when the PD includes the updated PD status information.

Also, when the PD does not include updated PD status information at a time point of receiving a PD status information update request from the CD, the result of processing of the PD status information update request may be understood as a kind of a confirmation response notifying the CD of the reception of the PD status information update request by the PD.

Table 15 below shows an example of a processing result transmitted to a CD application when a PD receives a service and content ID information request using a WS. The processing result may be transmitted with respect to at least one piece of information among the pieces of PD status information (i.e., information related to a service and/or content of a PD) exemplified in Table 7.

TABLE 15

```
<?xml version="1.0" encoding="UTF-8"?>
<AckStatusInfo>
    <statusID>cid</statusID>
    <responseCode>200</responseCode>
    <ack>subscribeAck</ack>
    <duration>1000</duration>
</serviceInfo>
```

In Table 15, a <statusID> field represents an example of a result of processing of a service and content ID information request using a WebSocket in Table 13.

In Table 15, <responseCode> indicates a result of a service and content ID information request in Table 13. The <responseCode> field may be used in the same meaning as a status code in a typical HTTP, and indicates "200", that is, successful processing of the service and content ID information request, in an example of Table 15. When the service and content ID information request is rejected for any reason, a status code, for example, in the range of 400's may be transmitted.

In Table 15, <ack> indicates which request an ACKnowledgement (ACK) responds to in Table 13. In the example, <ack> indicates an ACK of a subscribe request, and the meanings of <ack> values are described in an example of Table 16 below.

In Table 15, a duration field notifies the CD application of a duration time period (i.e., a subscription period) during which the PD may transmit the relevant information (or updated information) according to a service and content ID information request in Table 13. That is, in the example, the CD application has requested a duration time period for update which is, for example, infinite, but the PD may determine a duration time period for the update as, for example, 1000 seconds with respect to the request, and may transmit the relevant information during the determined duration time period. As an operation example, when the service and content ID information is updated within a duration time period for the update, the PD may transmit the updated service and content ID information to the CD.

TABLE 16

| Ack | Meaning |
| --- | --- |
| subscribeAck | indicates result of processing of update request |
| renewAck | indicates result of processing of renewal request |
| cancelAck | indicates result of processing of cancellation request |

In Table 16, ack values are mapped one-to-one to the command values shown in Table 14. Therefore, according to circumstances, the command field shown in Table 14 may be commonly used instead of using a separate <ack> field, and the values defined in Table 16 may be used as values of the commonly-used command field.

The update of status information of the PD, which responds to the PD status information request using the WebSocket protocol may also be described in the format described in Tables 9 to 16.

Figure 5:
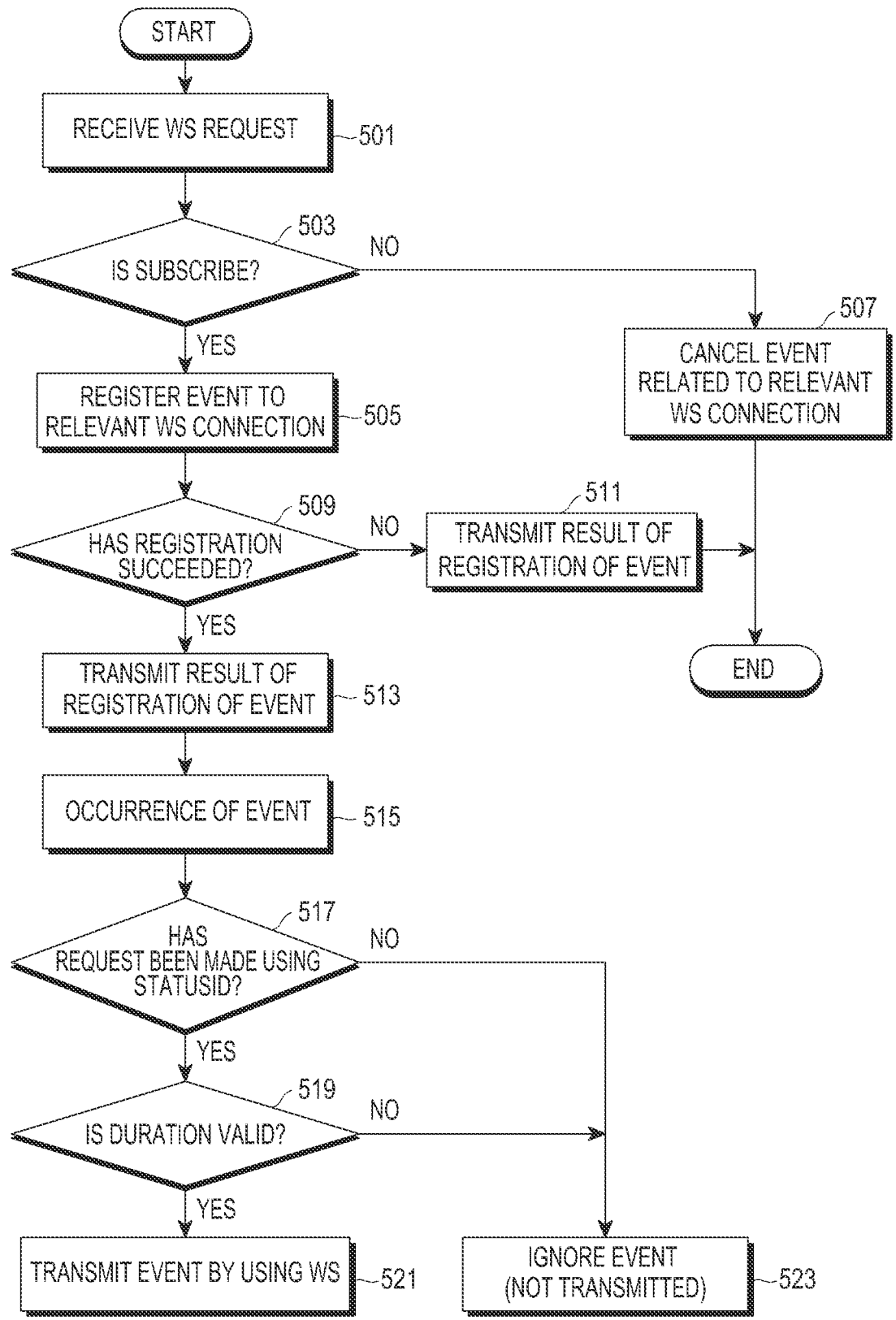
FIG. 5 is a view for explaining a procedure for processing, by a PD, a response to a request using a WebSocket protocol according to an embodiment of the present invention.

FIG. 5 is a view for explaining a procedure for processing, by a PD, a response to a request using a WebSocket protocol according to an embodiment of the present invention. The procedure of FIG. 5 may be performed when an event (e.g., update of PD status information) has occurred in the PD.

Referring to FIG. 5, in step 501, the PD first receives a request for PD status information from a CD application according to the WebSocket protocol. At this time, a received value is the same as in the example of Table 13 described above.

Then, in step 503, the PD analyzes a <command> field of the received request using the WebSocket protocol. When the value of the <command> field is subscribe, in step 505, if an event has occurred in the PD, the PD subscribes (registers) so as to allow the event to be transmitted to this WebSocket connection. Alternatively, when the value of the <command> field is cancel in step 503, the PD determines the request as a request for canceling the subscription of the relevant event, and in step 507, cancels the subscription and terminates the response procedure.

The PD registers the requested event in step 505, and when the registration succeeds (is accepted) in step 509, transmits a processing result of success of the registration to the CD application in step 513. Meanwhile, even when the registration has failed for any reason in step 509, similarly, the PD transmits a processing result of failure of the registration to the CD application in step 511, and terminates the response procedure. Meanwhile, after the event registration requested in step 505 is completed, when the update (event) of status information of the PD occurs in step 515, in step 517, the PD analyzes a <statusID> field of the request received in step 501 and determines whether a request for the relevant PD status information has been received. When the request for the relevant PD status information has not been received, the PD does not need to transmit the relevant event to the CD application, and thus, in step 523, the event is ignored and the response procedure is terminated.

Meanwhile, when it is determined in step 517 that the <statusID> field includes the request for the relevant PD status information, the PD proceeds to step 519 and determines whether a request time period described in a <duration> field is valid. When the request time period described in the <duration> field passes and the request for the PD status information is not valid, similarly, the PD does not need to transmit the relevant event to the CD application. Therefore, the PD proceeds to step 523 in which the relevant event is ignored and the response procedure is terminated. Then, when the request time period described in the <duration> field is valid in step 519, the PD proceeds to step 521 and transmits the relevant event to the CD application by using the WebSocket.

Figure 4:
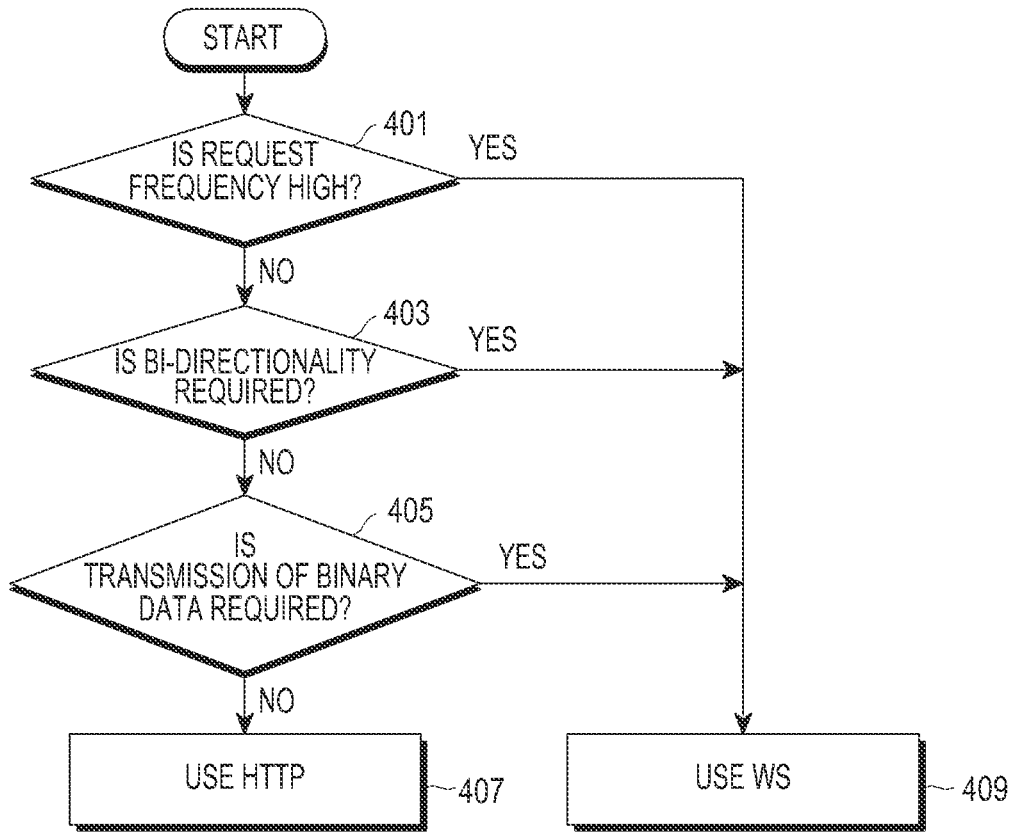
FIG. 4 is a view for explaining a procedure for selecting a method for requesting PD status information according to an embodiment of the present invention.

FIG. 4 is a view for explaining a procedure for selecting a method for requesting PD status information according to an embodiment of the present invention.

Referring to FIG. 4, in step 401, first, a determination is made as to whether a frequency of request for PD status information is high. When the frequency of request for PD status information is low, it is desirable to use an HTTP which allows the cost of a request to be relatively low. When a request frequently occurs, the use of a WebSocket which allows a relevant channel to be continuously maintained once a connection is made and allows the transmission of data through the relevant channel is more advantageous in terms of costs than a request made using the HTTP whenever the request occurs. Accordingly, when a request frequently occurs, it is desirable to use the WebSocket. Also, the WebSocket can easily provide asynchronous communication.

Then, in step 403, a determination is made as to whether bi-directionality is required. The bi-directionality implies that the CD application unilaterally sends a request for information to the PD and information can be transmitted to the CD application without a request made by the CD application when a status change occurs in the PD. Since the WebSocket supports bi-directional communication, when bi-directional communication is required, it is desirable to use the WebSocket.

Lastly, in step 405, a determination is made as to whether it is necessary to transmit binary data. The HTTP may also be used to transmit binary data, but the WebSocket has no limitation on bi-directionally transmitted data and thus, is more appropriate for binary transmission.

Then, according to the determinations in steps 401 to 405, a request for PD status information may be made using the HTTP in step 407, or may be made using the WebSocket in step 409.

A method for transmitting PD status information which uses the above-described method of FIG. 4 will be determined as follows.

Typically, it is enough if a request for service and content ID information is made when a CD application is first launched. Accordingly, a request frequency may be determined to be low, and it is enough if service and content ID information is transmitted to a CD application when the CD application first requests the service and content ID information. Accordingly, bi-directionality is not required. Also, service information may be typically described by using text information, such as XML or JSON, and thus, it is enough if the HTTP is used when the service information is applied to the flowchart illustrated in FIG. 4.

Next, since media timeline information is frequently updated whenever a PD reproduces media, it is desirable to use the WebSocket for the media timeline information.

Media reproduction information indicates a state (being reproduced, being stopped, being in a state of FF, etc.) of media that the PD is currently being reproduced, and has a lower request frequency than the above-described media timeline information. However, when a reproduction state of media is changed (e.g., from reproduction to stop), it is necessary to notify the CD application of the changed state, and thus, bi-directional communication is required. Accordingly, in this case, it is desirable to use the WS.

Typically, emergency alert information has a low possibility of being generated, but when the PD receives the relevant information, the PD needs to transmit the received information to the CD application without fail. Accordingly, bi-directionality is absolutely needed, and in this case, it is recommended to use the WS.

Figure 6:
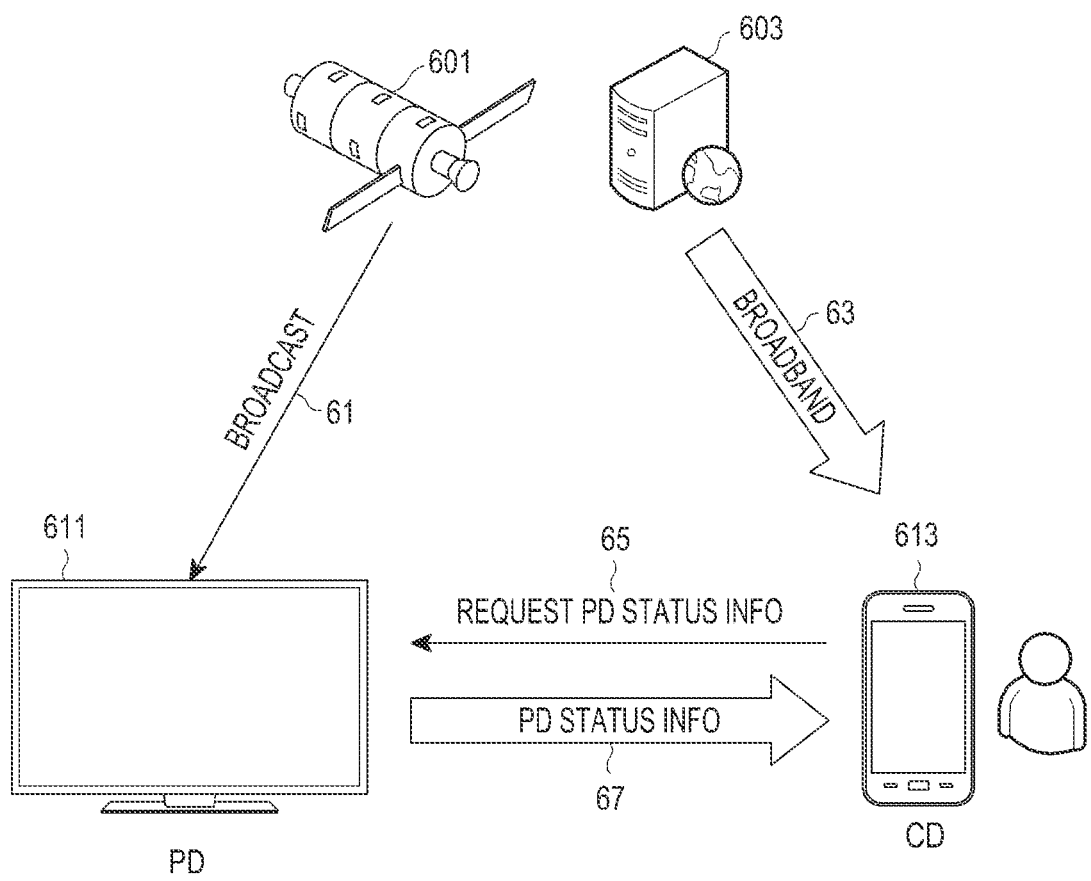
FIG. 6 is a view illustrating an example of an operation of transmitting/receiving PD status information through communication between devices according to an embodiment of the present invention.

According to embodiments of the present invention, when a multi-screen service is used in an environment where a broadcast service or broadcast content is provided from service provides 601 and 603 to multiple devices 611 and 613 through a broadcast network 61 or a broadband network 63 as in an example of FIG. 6, a method is provided for allowing a CD application to request (as indicated by reference numeral 65) and receive (as indicated by reference numeral 67) PD status information, and thereby allows a CD to operate in conjunction with a PD by using the CD application without a PD application. Also, a method capable of receiving status information of a PD by utilizing an existing companion screen structure and protocol is provided, and thereby, additional configuration and costs are not required.

What is claimed is:

1. A method of a first device for use of at least one of a broadcast service or content in a multimedia system, the method comprising:
    transmitting, by an application of the first device, a request for discovery of a second device, the first device being a companion device for communicating with the second device, the second device being a primary receiver for receiving the at least one of the broadcast service or content over a network;
    obtaining, by the application of the first device, second service endpoint information of a websocket server of the second device from a companion screen (CS) manager of the second device, wherein first service endpoint information of a web server of the second device is used to obtain the second service endpoint information of the websocket server of the second device;
    identifying, by the application of the first device, a type of first information to be requested;
    in case that the type of the first information is a media playback related information type, transmitting, by the application of the first device, a request message for requesting media playback related information to the second device, using the second service endpoint information of the websocket server; and
    receiving, by the application of the first device, a response message including the media playback related information via a websocket connection established using the second service endpoint information from the second device, and
    wherein the media playback related information includes at least one of playback state information indicating a state of a current media playback or playback speed information indicating a speed of the current media playback.

2. The method of claim 1, further comprising:
    in case that the type of the first information is a service information type or an electronic service guide (ESG) information type, transmitting, by the application of the first device, a request message for requesting service information or ESG information to the second device, using the first service endpoint information of the web server; and
    receiving, by the application of the first device, a response message including the service information or the ESG information from the second device.

3. The method of claim 2, wherein the service information includes service identifier information indicating an identifier of a current service.

4. The method of claim 1, wherein the websocket connection is established without using application to application communication between the first device and the second device.

5. The method of claim 1, wherein the first information comprises address information for accessing the broadcast service or the content.

6. A method of a second device for use of at least one of a broadcast service or content in a multimedia system, the method comprising:
    receiving, by a companion screen (CS) manager of the second device, a request for discovery of the second device from an application of a first device, the first device being a companion device for communicating with the second device, the second device being a primary receiver for receiving the at least one of the broadcast service or content over a network;
    transmitting, by the CS manager of the second device, second service endpoint information of a websocket server of the second device to the application of the first device, wherein first service endpoint information of a web server of the second device is used to obtain the second service endpoint information of the websocket server of the second device;
    in case that a type of first information requested from the first device is a media playback related information type, receiving, from the application of the first device, a request for media playback related information, via the second service endpoint information of the websocket server; and
    transmitting, to the application of the first device, the media playback related information via a websocket connection established using the second service endpoint information, and
    wherein the media playback related information includes at least one of playback state information indicating a state of a current media playback or playback speed information indicating a speed of the current media playback.

7. The method of claim 6, further comprising:
    in case that the type of the first information is a service information type or an electronic service guide (ESG) information type, transmitting, from the application of the first device, a request for receiving service information or ESG information to the second device, via the first service endpoint information of the web server; and
    transmitting, to the application of the first device, the service information or the ESG information.

8. The method of claim 7, wherein the service information includes service identifier information indicating an identifier of a current service.

9. The method of claim 6, wherein the websocket connection is established without using application to application communication between the first device and the second device.

10. The method of claim 6, wherein the first information comprises address information for accessing the broadcast service or the content.

* * * * *